Figure 1:
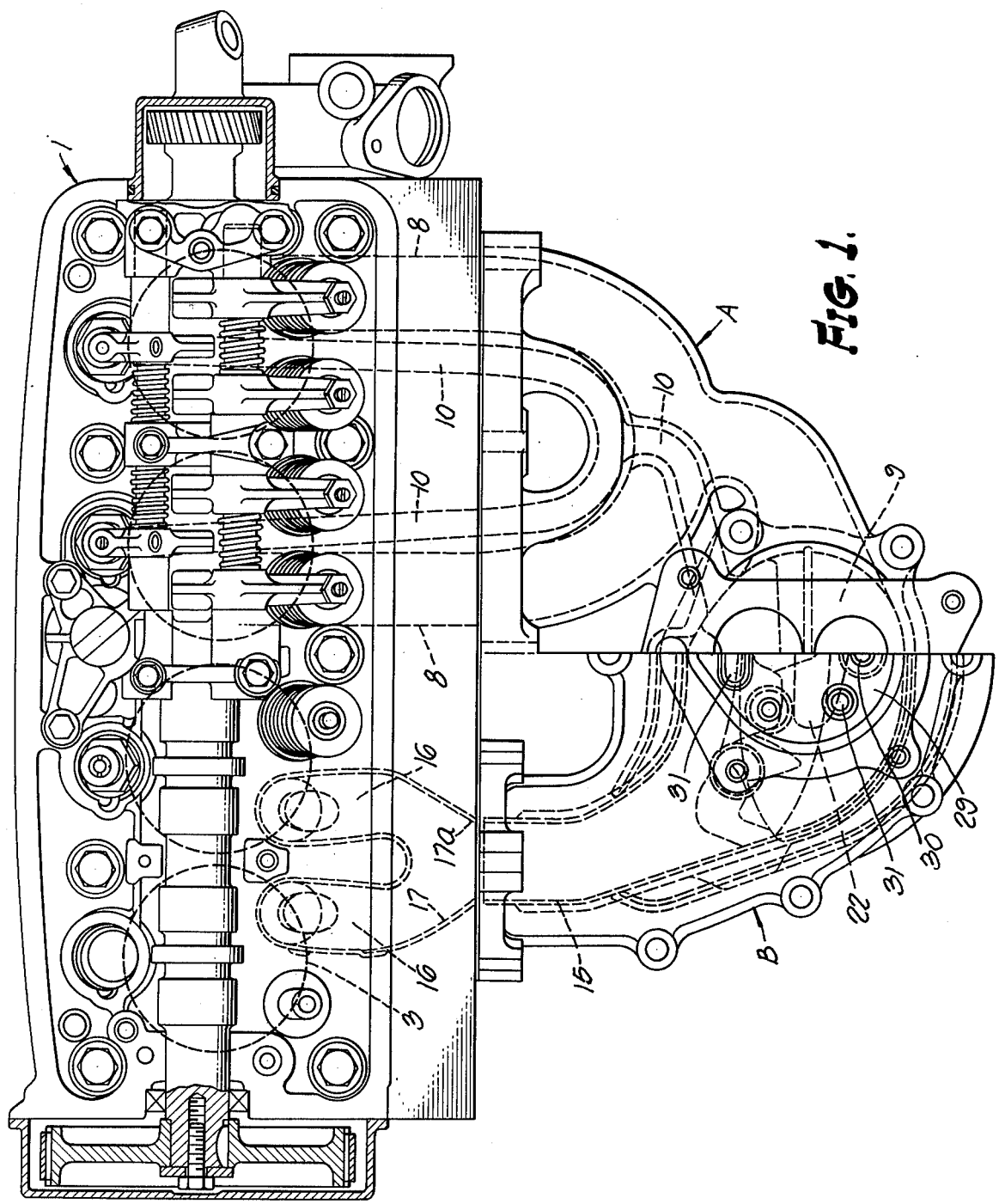

United States Patent [19]

Nakano et al.

[11] 4,099,500

[45] Jul. 11, 1978

[54] EXHAUST SYSTEM FOR INTERNAL COMBUSTION ENGINE

[75] Inventors: Soichi Nakano, Kawagoe; Yasumichi Ohama, Mitaka; Masao Watanabe, Asaka, all of Japan

[73] Assignee: Honda Giken Kogyo Kabushiki Kaisha, Tokyo, Japan

[21] Appl. No.: 596,411

[22] Filed: Jul. 16, 1975

[30] Foreign Application Priority Data

Jul. 22, 1974 [JP] Japan .................... 49-83287

[51] Int. Cl.$^2$ .................... F02B 19/10
[52] U.S. Cl. .................... 123/122 AB; 60/282; 60/323; 123/52 M
[58] Field of Search .................... 123/122 AB, 122 AC, 123/122 R, 32 ST, 32 SP, 75 B, 52 M; 165/52; 60/322, 282, 323, 320

[56] References Cited

U.S. PATENT DOCUMENTS

| | | | |
|---|---|---|---|
| 2,503,071 | 4/1950 | Scherger | 123/52 M |
| 3,302,394 | 2/1967 | Pahnke et al. | 60/302 |
| 3,633,368 | 1/1972 | Rosenlund | 60/282 |
| 3,635,031 | 1/1972 | Haddad | 60/323 |
| 3,659,564 | 5/1972 | Suzuki et al. | 123/32 ST X |
| 3,799,196 | 3/1974 | Scheitlin et al. | 60/323 X |
| 3,895,617 | 7/1975 | Sakurai | 123/122 AB X |
| 3,898,804 | 8/1975 | Morita | 60/323 |
| 3,916,850 | 11/1975 | Date et al. | 123/52 M |
| 3,924,591 | 12/1975 | Bond et al. | 123/122 AB X |
| 3,964,460 | 6/1976 | Nakano et al. | 123/122 AB X |
| 3,965,881 | 6/1976 | Sakurai et al. | 60/282 X |
| 3,994,270 | 11/1976 | Nakano et al. | 123/325 P X |

Primary Examiner—Charles J. Myhre
Assistant Examiner—Tony M. Argenbright
Attorney, Agent, or Firm—Lyon & Lyon

[57] ABSTRACT

A multi-cylinder internal combustion engine of the type having an auxiliary combustion chamber associated with each main combustion chamber, and connected thereto by a torch opening, is provided with an improved manifold system and exhaust reaction chamber for maintaining the exhaust gases at a relatively high temperature in order to reduce unwanted emissions discharged into the atmosphere supplied to the auxiliary combustion chambers and also for heating the lean air-fuel mixture supplied by the primary carburetor barrel to the main combustion chambers. Thin wall liners having low thermal capacity are provided for adjacent pairs of exhaust ports in the engine, each liner having a single exit opening. Exhaust collection pipes receive exhaust gases from said liners and convey them to an inner exhaust reaction chamber and then in a one-way flow through an outer reaction chamber which surrounds and encloses the inner chamber. An improved heat exchange device employs the heat of gases in the outer chamber to heat a rich air-fuel mixture supplied to the auxiliary combustion chambers and also to heat a lean air-fuel mixture supplied to the main combustion chambers.

5 Claims, 2 Drawing Figures

EXHAUST SYSTEM FOR INTERNAL COMBUSTION ENGINE

This invention relates to internal combustion engines of the type having an auxiliary combustion chamber associated with each main combustion chamber and connected thereto by a torch opening. Such an engine is shown in the Date et al U.S. Pat. No. 3,890,942 granted June 24, 1975. In the device disclosed in that patent a rich mixture is supplied from one carburetor barrel to the auxiliary combustion chambers and a lean mixture is supplied from another carburetor barrel to the main combustion chambers. In practice, three separate carburetor barrels are employed, one for the rich mixture and two for the lean mixture. Of the latter two, one is brought into action only when the engine is operating under heavy load. It is important to maintain the temperature of the exhaust gases at a level sufficiently high to oxidize CO and HC in the exhaust system and thereby minimize the discharge of these pollutants into the atmosphere, and still have ample remaining heat to vaporize the rich mixture and one of the lean mixtures.

Accordingly, this invention contemplates the provision of an improved exhaust reaction chamber for oxidizing CO and HC and also the provision of thin wall liners of low thermal capacity for minimizing heat loss in the engine exhaust ports.

Other and more detailed objects and advantages will appear hereinafter. In the drawings:

FIG. 1 is a plan view partly broken away and partly in section, showing a preferred embodiment of this invention.

Figure 2:
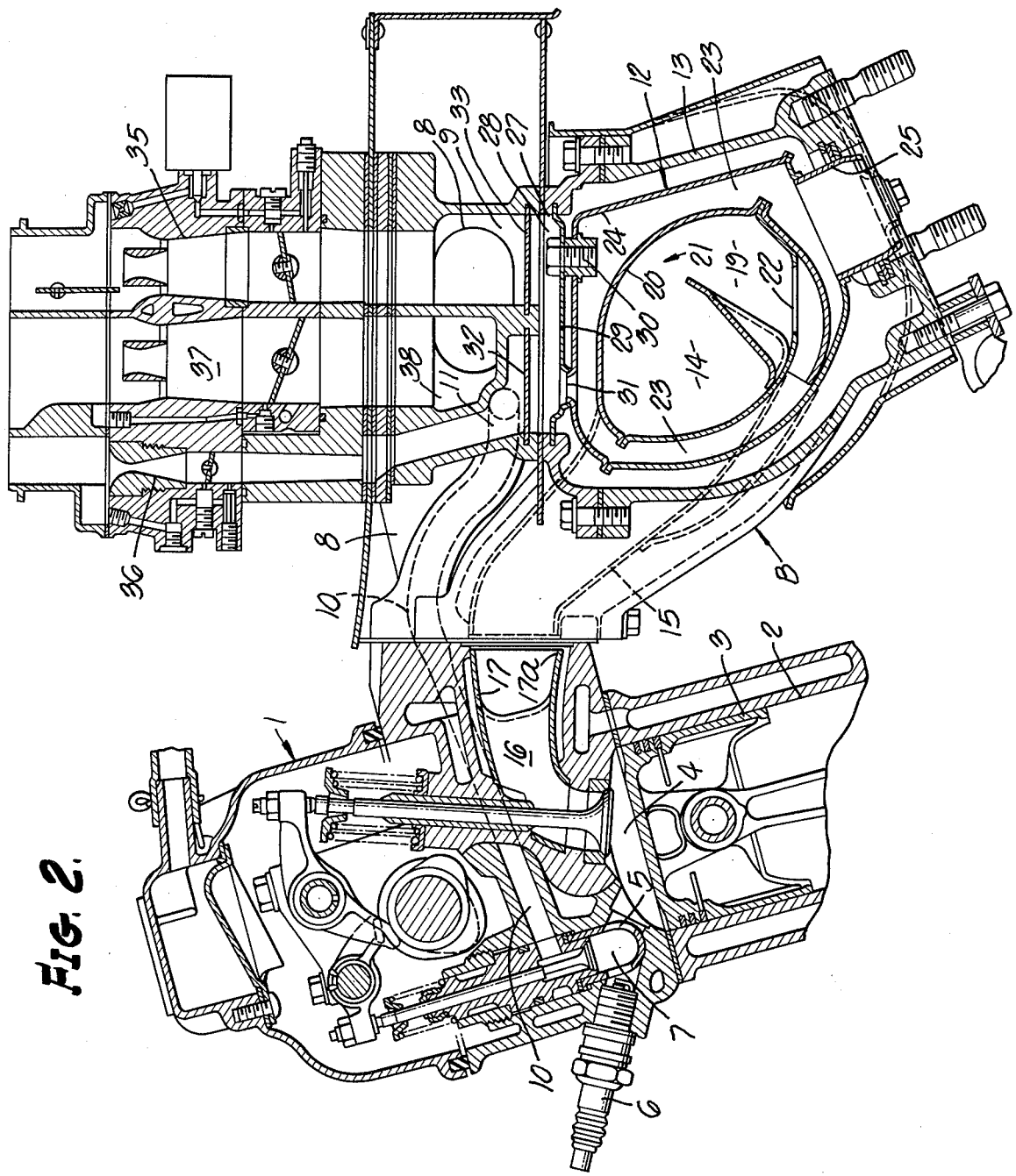

FIG. 2 is a sectional side elevation thereof. Referring to the drawings, the engine 1 has multiple cylinders 2 each provided with a piston 3 forming one wall of a main combustion chamber 4. An auxiliary combustion chamber 7 is connected to each main combustion chamber 4 through a torch opening 5. A spark plug 6 is provided for each auxiliary combustion chamber 7.

An intake manifold A has walls forming a primary intake cavity 9 connected to each main combustion chamber 4 through intake passages 8. The intake manifold A also has walls forming an auxiliary intake cavity 11 connected to each auxiliary combustion chamber 7 through auxiliary intake passages 10. An exhaust manifold B comprises a double chamber device 12 spaced within and enveloped by a thick wall housing 13. The thin walls of the double chamber device 12 are formed of a heat resistant metal having low thermal capacity, such as, for example, stainless steel. The inner reaction chamber 14 within the device 12 receives exhaust gases from the engine through collector pipes 15 comprising a part of the device 12. Each collector pipe 15 receives exhaust gases from two adjacent exhaust ports 16 in the engine 1. The exhaust ports 16 are provided with liners 17 formed of thin wall heat resistant metal having a low thermal capacity, for example, stainless steel. A single liner 17 accomodates two adjacent exhaust ports and has a single exit opening 17a aligned with a collector pipe 15.

The exhaust gases pass from the first chamber 14 into the sub-chamber 19 within the inner wall 20 through the opening 21. Exhaust gases pass from the sub-chamber 19 in a one-way directed flow through the opening 22 and into the surrounding outer chamber 23 between the inner wall 20 and the outer wall 24. The outer chamber 23 envelops the first chamber 14 and the sub-chamber 19. Exhaust gases escape from the third chamber 23 through the discharge pipe 25 and pass through a silencer, not shown. The heat of the exhaust gases is retained within the port liners 17 in the exhaust ports 16 and within the double wall device 12 within the housing 13, and the tortuous path for exhaust gases provided through the chambers 14, 19 and 23 holds the exhaust gases at relatively high temperature for a relatively long residence time. Since the overall air-fuel ration of mixtures admitted into the combustion chambers is leaner than stoichiometric, there is an excess of oxygen in the exhaust gases. The long residence time at high temperature of the gases within the exhaust manifold causes harmful CO to be changed to harmless $CO_2$ and causes continuing oxidation of HC to reduce unburned hydrocarbons in the exhaust gases when discharged into the atmosphere.

Walls 27 on the housing 13 define an upward facing opening 28. A heat resistant plate 29 encloses this opening 28, and this plate 29 is formed of the same material as the double wall device 12. Threaded fastenings 30 connect the plate 29 to the outer wall 24 of the liner 12. The outer wall 24 and the plate 29 have a plurality of aligned openings 31 to permit exhaust gases from the outer chamber 23 to contact the plates 32 and 33. These plates are formed of heat resistant thin wall metal of low thermal capacity, for example, stainless steel. Heat is transferred from the exhaust manifold B through plate 32 to heat the rich mixture in the auxiliary intake cavity 11. Similarly, heat is transferred from the exhaust manifold B through the plate 33 to heat the lean mixture in the primary intake cavity 9.

The primary carburetor barrel 35 delivers a lean mixture to the primary intake cavity 9, and the auxiliary carburetor barrel 36 delivers a rich mixture to the auxiliary intake cavity 11. The secondary carburetor barrel 37 also delivers a lean mixture, but this barrel is active only when the engine is operated under heavy load, and remains inactive during idling or low load conditions. Accordingly, the secondary intake cavity 38 is spaced from the opening 28 and is not heated by the exhaust gases. It discharges into the same intake passage 8 as the primary intake cavity 9. The relatively low temperature of the additional lean air-fuel mixture supplied through the secondary intake cavity 38 increases the total weight of air-fuel mixture supplied to the engine, with consequent improvement in power output.

A major portion of the length of each liner 17 is spaced within the walls defining the exhaust ports 16. The use of paired heat resistant liners 17 within adjacent exhaust ports 16 of the engine assists in maintaining the exhaust gases at as high a temperature as possible in the exhaust collection chamber 14, so that emission control is improved. This is particularly effective during low load operation of the engine.

Having fully described our invention, it is to be understood that our invention is not to be limited to the details herein set forth, but that out invention is of the full scope of the appended claims.

We claim:

1. In a multi-cylinder internal combustion engine, the combination of: means including exhaust ports in the engine leading from combustion chambers, at least two of said exhaust ports being positioned as an adjacent pair, and exhaust manifold provided with at least one exhaust collection pipe, said adjacent pair of exhaust ports having a single thin-wall metallic liner positioned within both exhaust ports, said liner being formed of heat resistant metal of low thermal capacity, said liner having one exit opening communicating with said exhaust collection pipe.

2. The combination set forth in claim 1 in which portions of the exhaust port liners are spaced within walls defining said engine exhaust ports.

3. In an internal combustion engine having a plurality of cylinders each provided with a combustion chamber, the combination of: exhaust ports in the engine each leading from a combustion chamber, at least two of said exhaust ports being positioned as an adjacent pair, a single thin-wall port liner positioned within both of said exhaust ports and having a single exit opening, said exhaust port liner being formed of heat resistant material of low thermal capacity, an exhaust manifold having a thick-wall housing enclosing an exhaust reaction chamber device, said device having thin walls defining an inner chamber surrounded and enclosed by an outer chamber, at least one exhaust collection pipe connected to receive exhaust gases from said exit opening of said exhaust port liner and to deliver said gases directly into said inner chamber, and port means for causing all of said gases to flow in the same direction through the surrounding outer chamber to minimize loss of heat from walls of the inner chamber.

4. In an internal combustion engine having a plurality of cylinders each provided with a combustion chamber, the combination of: means including an intake manifold for supplying an air-fuel mixture to the combustion chambers, exhaust ports in the engine each leading from a combustion chamber, at least two of said exhaust ports being positioned as an adjacent pair, a single thin-wall port liner positioned within both of said exhaust ports and having a single exit opening, said exhaust port liner being formed of heat resistant material of low thermal capacity, an exhaust manifold having a thick-wall housing enclosing an exhaust reaction chamber device, said device having thin walls defining an inner chamber surrounded by an outer chamber, at least one exhaust collection pipe connected to receive exhaust gases from said exit opening of said exhaust port liner and to deliver said gases directly into said inner chamber, port means for causing said gases to pass through the surrounding outer chamber to minimize loss of heat from the walls of the inner chamber, heat transfer wall means operatively interposed between a portion of the intake manifold and the exhaust manifold housing whereby said air-fuel mixture in the intake manifold may be heated from the gases passing through said outer chamber.

5. The combination set forth in claim 4 in which said housing has an upward facing opening, a thin-wall apertured support plate mounted across said opening, means mounting a wall of said outer chamber on said apertured support plate, said heat transfer wall means including a thin metal wall contacted on one side by said air-fuel mixture and exposed on the other side to exhaust gases passing through said apertured support plate.

* * * * *